United States Patent
Fink et al.

(10) Patent No.: US 9,161,387 B2
(45) Date of Patent: Oct. 13, 2015

(54) WIRELESS ACCESS POINTS PROVIDING HYBRID 802.11 AND SCHEDULED PRIORITY ACCESS COMMUNICATIONS

(71) Applicants: Jaime Fink, San Francisco, CA (US); David Gurevich, San Mateo, CA (US); Brian Hinman, Los Gatos, CA (US); Ashok N. Masilamani, Santa Cruz, CA (US); Vishakan Ponnampalam, Palo Alto, CA (US)

(72) Inventors: Jaime Fink, San Francisco, CA (US); David Gurevich, San Mateo, CA (US); Brian Hinman, Los Gatos, CA (US); Ashok N. Masilamani, Santa Cruz, CA (US); Vishakan Ponnampalam, Palo Alto, CA (US)

(73) Assignee: Mimosa Networks, Inc., Santa Clara, CA (US)

(*) Notice: Subject to any disclaimer, the term of this patent is extended or adjusted under 35 U.S.C. 154(b) by 0 days.

(21) Appl. No.: 14/045,741

(22) Filed: Oct. 3, 2013

(65) Prior Publication Data
US 2014/0355584 A1    Dec. 4, 2014

Related U.S. Application Data

(62) Division of application No. 13/906,128, filed on May 30, 2013.

(51) Int. Cl.
| | | |
|---|---|---|
| H04W 4/00 | (2009.01) | |
| H04W 88/08 | (2009.01) | |
| H04W 74/08 | (2009.01) | |
| H04W 84/12 | (2009.01) | |

(52) U.S. Cl.
CPC .......... *H04W 88/08* (2013.01); *H04W 74/0816* (2013.01); *H04W 84/12* (2013.01)

(58) Field of Classification Search
CPC ..... H04W 88/06; H04W 88/08; H04W 88/02; H04W 84/18
See application file for complete search history.

(56) References Cited

U.S. PATENT DOCUMENTS

| | | |
|---|---|---|
| 2,735,993 A | 2/1956 | Humphrey |
| 4,402,566 A | 9/1983 | Powell et al. |
| 4,986,764 A | 1/1991 | Eaby et al. |
| 5,015,195 A | 5/1991 | Piriz |
| 5,226,837 A | 7/1993 | Cinibulk et al. |

(Continued)

FOREIGN PATENT DOCUMENTS

| | | |
|---|---|---|
| EP | 002640177 | 10/2013 |
| WO | WO2014137370 | 9/2014 |

(Continued)

OTHER PUBLICATIONS

International Search Report and Written Opinion of the International Search Authority mailed Nov. 26, 2013 in Patent Cooperation Treaty Application No. PCT/US2013/047406, filed Jun. 24, 2013.

(Continued)

*Primary Examiner* — Kibrom T Hailu
(74) *Attorney, Agent, or Firm* — Carr & Ferrell LLP

(57) ABSTRACT

Wireless access points providing hybrid 802.11 and scheduled priority access communications are provided herein. An exemplary wireless access point may be configured to communicate with a set of standard access clients using an 802.11 mode of communication during standard access phases, as well as communicate with a set of priority access clients during priority access phases, when the wireless access point is not communicating with the set of standard access clients, using a priority mode of communication.

6 Claims, 8 Drawing Sheets

(56) References Cited

U.S. PATENT DOCUMENTS

| | | | |
|---|---|---|---|
| 5,513,380 A | 4/1996 | Ivanov et al. | |
| 5,580,264 A | 12/1996 | Aoyama et al. | |
| 5,746,611 A | 5/1998 | Brown et al. | |
| 6,176,739 B1 | 1/2001 | Denlinger et al. | |
| 6,421,538 B1 | 7/2002 | Byrne | |
| 6,716,063 B1 | 4/2004 | Bryant et al. | |
| 6,754,511 B1 | 6/2004 | Halford et al. | |
| 6,847,653 B1 | 1/2005 | Smiroldo | |
| 6,877,277 B2 | 4/2005 | Kussel et al. | |
| 6,962,445 B2 | 11/2005 | Zimmel et al. | |
| 7,264,494 B2 | 9/2007 | Kennedy et al. | |
| 7,281,856 B2 | 10/2007 | Grzegorzewska et al. | |
| 7,306,485 B2 | 12/2007 | Masuzaki | |
| 7,324,057 B2 | 1/2008 | Argaman et al. | |
| 7,380,984 B2 | 6/2008 | Wuester | |
| 7,431,602 B2 | 10/2008 | Corona | |
| 7,507,105 B1 | 3/2009 | Peters et al. | |
| 7,542,717 B2 | 6/2009 | Green, Sr. et al. | |
| 7,581,976 B2 | 9/2009 | Liepold et al. | |
| 7,616,959 B2 | 11/2009 | Spenik et al. | |
| 7,726,997 B2 | 6/2010 | Kennedy et al. | |
| 7,778,226 B2 * | 8/2010 | Rayzman et al. | 370/337 |
| 7,857,523 B2 | 12/2010 | Masuzaki | |
| RE42,522 E | 7/2011 | Zimmel et al. | |
| 8,069,465 B1 | 11/2011 | Bartholomay et al. | |
| 8,515,434 B1 | 8/2013 | Narendran et al. | |
| 8,777,660 B2 | 7/2014 | Chiarelli et al. | |
| 8,792,759 B2 | 7/2014 | Benton et al. | |
| 8,827,729 B2 | 9/2014 | Gunreben et al. | |
| 9,001,689 B1 | 4/2015 | Hinman et al. | |
| 2002/0102948 A1 | 8/2002 | Stanwood et al. | |
| 2002/0159434 A1 | 10/2002 | Gosior et al. | |
| 2003/0013452 A1 | 1/2003 | Hunt et al. | |
| 2003/0027577 A1 | 2/2003 | Brown et al. | |
| 2003/0224741 A1 | 12/2003 | Sugar et al. | |
| 2004/0029549 A1 | 2/2004 | Fikart | |
| 2004/0120277 A1 | 6/2004 | Holur et al. | |
| 2004/0240376 A1 | 12/2004 | Wang et al. | |
| 2005/0032479 A1 | 2/2005 | Miller et al. | |
| 2005/0195758 A1 | 9/2005 | Chitrapu | |
| 2005/0227625 A1 | 10/2005 | Diener | |
| 2006/0072518 A1 | 4/2006 | Pan et al. | |
| 2006/0172578 A1 | 8/2006 | Parsons | |
| 2006/0187952 A1 | 8/2006 | Kappes et al. | |
| 2007/0001910 A1 | 1/2007 | Yamanaka et al. | |
| 2007/0019664 A1 | 1/2007 | Benveniste | |
| 2007/0060158 A1 | 3/2007 | Medepalli et al. | |
| 2007/0173199 A1 | 7/2007 | Sinha | |
| 2007/0173260 A1 | 7/2007 | Love et al. | |
| 2007/0223701 A1 | 9/2007 | Emeott et al. | |
| 2007/0238482 A1 | 10/2007 | Rayzman et al. | |
| 2007/0268848 A1 | 11/2007 | Khandekar et al. | |
| 2008/0109051 A1 | 5/2008 | Splinter et al. | |
| 2008/0112380 A1 | 5/2008 | Fischer | |
| 2008/0242342 A1 | 10/2008 | Rofougaran | |
| 2009/0052362 A1 | 2/2009 | Meier et al. | |
| 2009/0232026 A1 | 9/2009 | Lu | |
| 2009/0233475 A1 | 9/2009 | Mildon et al. | |
| 2009/0291690 A1 | 11/2009 | Guvenc et al. | |
| 2010/0029282 A1 | 2/2010 | Stamoulis et al. | |
| 2010/0046650 A1 | 2/2010 | Jongren et al. | |
| 2010/0103065 A1 | 4/2010 | Shtrom et al. | |
| 2010/0103066 A1 | 4/2010 | Shtrom et al. | |
| 2010/0171675 A1 | 7/2010 | Borja et al. | |
| 2010/0189005 A1 | 7/2010 | Bertani et al. | |
| 2010/0210147 A1 | 8/2010 | Hauser | |
| 2010/0315307 A1 | 12/2010 | Syed et al. | |
| 2011/0006956 A1 | 1/2011 | McCown | |
| 2011/0028097 A1 | 2/2011 | Memik et al. | |
| 2011/0044186 A1 | 2/2011 | Jung et al. | |
| 2011/0103309 A1 | 5/2011 | Wang et al. | |
| 2011/0170424 A1 | 7/2011 | Safavi | |
| 2011/0172916 A1 | 7/2011 | Pakzad et al. | |
| 2011/0194644 A1 | 8/2011 | Liu et al. | |
| 2011/0243291 A1 | 10/2011 | McAllister et al. | |
| 2012/0008542 A1 * | 1/2012 | Koleszar et al. | 370/312 |
| 2012/0040700 A1 * | 2/2012 | Gomes et al. | 455/500 |
| 2012/0057533 A1 | 3/2012 | Junell et al. | |
| 2012/0134280 A1 | 5/2012 | Rotvold et al. | |
| 2012/0238201 A1 | 9/2012 | Du et al. | |
| 2012/0314634 A1 | 12/2012 | Sekhar | |
| 2013/0005350 A1 | 1/2013 | Campos et al. | |
| 2013/0023216 A1 | 1/2013 | Moscibroda et al. | |
| 2013/0176902 A1 | 7/2013 | Wentink et al. | |
| 2013/0182652 A1 * | 7/2013 | Tong et al. | 370/329 |
| 2013/0195081 A1 | 8/2013 | Merlin et al. | |
| 2013/0210457 A1 | 8/2013 | Kummetz | |
| 2013/0288735 A1 | 10/2013 | Guo | |
| 2014/0098748 A1 | 4/2014 | Chan et al. | |
| 2014/0145890 A1 | 5/2014 | Ramberg et al. | |
| 2014/0198867 A1 | 7/2014 | Sturkovich et al. | |
| 2014/0233613 A1 | 8/2014 | Fink et al. | |
| 2014/0235244 A1 | 8/2014 | Hinman | |
| 2014/0253378 A1 | 9/2014 | Hinman | |
| 2014/0253402 A1 | 9/2014 | Hinman et al. | |
| 2014/0254700 A1 | 9/2014 | Hinman et al. | |
| 2014/0256166 A1 | 9/2014 | Ramos et al. | |
| 2014/0320306 A1 | 10/2014 | Winter | |
| 2014/0320377 A1 | 10/2014 | Cheng et al. | |
| 2014/0355578 A1 | 12/2014 | Fink et al. | |
| 2015/0002335 A1 | 1/2015 | Hinman et al. | |
| 2015/0215952 A1 | 7/2015 | Hinman et al. | |

FOREIGN PATENT DOCUMENTS

| | | |
|---|---|---|
| WO | WO2014138292 | 9/2014 |
| WO | WO2014193394 | 12/2014 |
| WO | WO2015112627 | 7/2015 |

OTHER PUBLICATIONS

International Search Report and Written Opinion of the International Search Authority mailed Aug. 9, 2013 in Patent Cooperation Treaty Application No. PCT/US2013/043436, filed May 30, 2013.

International Search Report and Written Opinion of the International Search Authority mailed Jul. 1, 2014 in Patent Cooperation Treaty Application No. PCT/US2014/020880, filed Mar. 5, 2014.

Hinman et al., Provisional U.S. Appl. No. 61/774,632, filed Mar. 7, 2013.

International Search Report and Written Opinion of the International Search Authority mailed Jun. 29, 2015 in Patent Cooperation Treaty Application No. PCT/US2015/012285, filed Jan. 21, 2015.

First Official Notification mailed Jun. 15, 2015 in Chinese Design Patent Application 201530058063.8, filed Mar. 11, 2015.

* cited by examiner

WIRELESS ACCESS POINTS PROVIDING HYBRID 802.11 AND SCHEDULED PRIORITY ACCESS COMMUNICATIONS

CROSS-REFERENCE TO RELATED APPLICATIONS

The present application is a divisional of, and claims the priority benefit of, U.S. patent application Ser. No. 13/906,128 filed May 30, 2013, entitled "Wireless Access Points Providing Hybrid 802.11 and Scheduled Priority Access Communications," which is incorporated by reference in its entirety herein.

FIELD OF THE INVENTION

The present invention relates generally to wireless communications, and more specifically, but not by way of limitation, to wireless access points that are configured to service a hybrid collection of standard 802.11 clients and priority access clients.

BACKGROUND

A wireless access point (AP) is a device that allows wireless devices such as computers, telephones, appliances, and other similar network enabled computing devices to connect to a wired network using Wi-Fi, or related standards. The AP allows the network enabled devices to access, for example, the Internet, or allows the network enabled devices to communicate with one another over the network. APs typically utilize one or more protocols specified in the IEEE 802.11 standards. That is, an AP may be configured to service clients that utilize one or more protocols that are IEEE 802.11 standards compliant.

SUMMARY

According to some embodiments, the present disclosure is directed to a wireless access point that comprises: (a) a processor; and (b) a memory for storing instructions, wherein the instructions when executed by the processor cause the wireless access point to perform operations comprising: (i) communicating with a set of standard access clients using an 802.11 mode of communication during standard access phases; and (ii) communicating with a set of priority access clients during priority access phases, when the wireless access point is not communicating with the set of standard access clients, using a priority mode of communication.

According to some embodiments, the present disclosure is directed to a method of communicating with standard 802.11 clients and priority access clients that utilize a priority access MAC protocol, using a wireless access point. The method may comprise: (i) silencing both standard access clients and priority access clients prior to standard access phases; (ii) communicating with standard access clients using an 802.11 mode of communication during standard access phases; (iii) silencing both standard access clients and priority access clients prior to priority access phases; and (iv) communicating with groups of priority access clients during priority access phases using the priority access MAC protocol.

According to some embodiments, the present disclosure is directed to a computing device configured to communicate with a wireless access point using a media access control (MAC) protocol. The computing device comprises: (a) a processor; and (b) a memory for storing a MAC protocol, wherein the MAC protocol is executed by the processor to: (i) evaluate a priority activation frame received from the wireless access point to determine if a group identifier included in the priority activation frame corresponds to a group identifier assigned to the computing device by the wireless access point; (ii) communicate with the wireless access point, for a specified period of time specified in the priority activation frame, if the group identifier of the priority activation frame matches the group identifier of the computing device; and (iii) cease communication with the wireless access point if the group identifier of the priority activation frame does not match the group identifier of the computing device.

According to some embodiments, the present disclosure is directed to a node within a wireless communications network that schedules access for both standard 802.11 clients and priority access clients to the Internet, the node comprising: (a) a standard 802.11 client interface for communicating with client devices using a standard 802.11 mode; (b) a priority media access control/physical (MAC/PHY) interface for communicating with client devices using a priority access MAC protocol; and (c) a scheduling module that manages standard access phases and priority access phases, wherein the standard access phases comprise time periods where the node silences client devices using the priority access MAC protocol and allows client devices using a standard 802.11 mode to communicate with the node, and wherein the priority access phases comprise time periods where the node silences client devices using standard 802.11 mode and allows client devices using the priority access MAC protocol to communicate with the node.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be further understood that the technology is not necessarily limited to the particular embodiments illustrated herein.

DETAILED DESCRIPTION OF EXEMPLARY EMBODIMENTS

Figure 1:
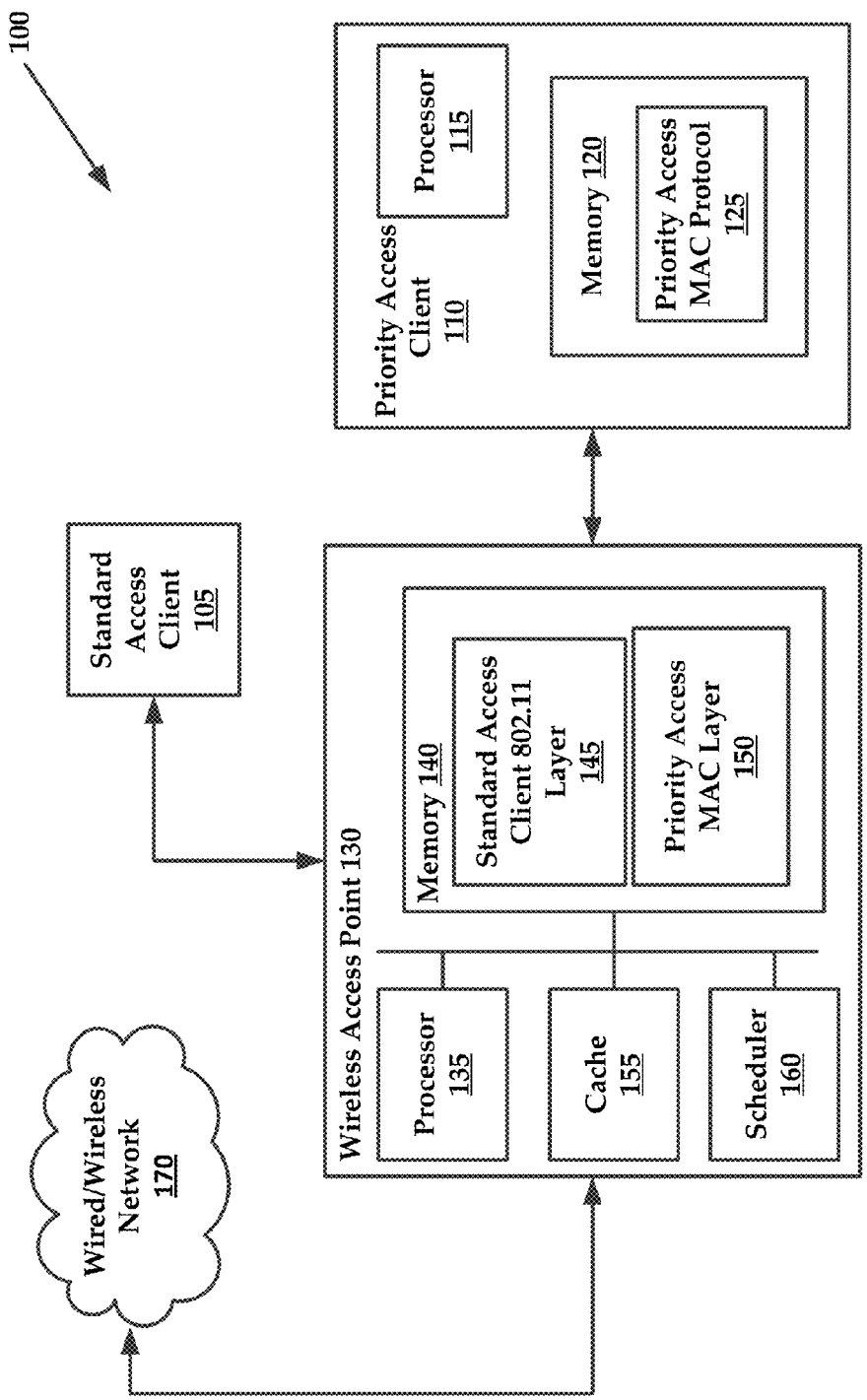
FIG. 1 is an exemplary WiFi network that may be utilized to practice aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present technology provides a wireless access point (AP) that utilizes both traditional 802.11 AP modes that support standard 802.11 Wi-Fi clients, as well as a priority access MAC-PHY interface for servicing enhanced scheduled priority access clients. The present technology increases the client capacity on the AP by managing individual fixed broadband client airtime fairness, reducing latency, and advantageously providing open service to traditional Wi-Fi devices on the same radio.

By providing timed windows of opportunity during which the AP supports standards compatible 802.11 devices, and then notifying the 802.11 devices to cease transmitting for upcoming intervals, an AP can concurrently leverage those additional intervals for scheduled medium access to better manage the diverse latency sensitive higher throughput demanding fixed client population. Advantageously, a single AP can provide high capacity and improved efficiency fixed and Wi-Fi support, and adapt bandwidths as necessary to respond to the changing needs in fixed and nomadic device types and their varying usage application demands.

Fixed broadband wireless clients at homes and businesses are quite diverse in location and distance from an AP. Additionally, these clients may be directionally oriented with the AP to achieve increased operation distance by leveraging high gain directional antenna radiation patterns. Given these usage scenarios clients may heavily interfere with each other as individual clients are not visible to each other throughout the service footprint. IEEE 802.11 standards implemented at the AP attempt to solve this problem using Carrier Sense Multiple Access (CSMA), but as distance and antenna directionality increase, almost every device becomes a hidden node causing unusable client transmission interference.

Therefore, if an AP uses traditional 802.11 CSMA and does not adapt, if one client channel does not sense the transmission of another client, the client believes it can transmit to the AP and naturally causes interference.

As a result, most fixed broadband wireless implementations implement time division duplexing (TDD) or frequency division duplexing (FDD), fixed scheduling protocols to manage the scheduling between clients using a priority access MAC/PHY layer(s). Unfortunately, these priority access layers are not compatible with the over 10 billion traditional (e.g., standard) 802.11 Wi-Fi devices, which include many smart tablet/phones and laptops.

The 802.11 standards have attempted to support some forms of quality of service improvements using, for example, Point Coordination Function (PCF) and Hybrid Coordination Function (HCF). With PCF, contention free periods are setup by the AP and managed by the AP (Point Coordinator), in which all but a single client device is allowed to transfer frames. Industry support for PCF has been very minimal and it is known that many client devices currently in deployment do not fully comply with contention free periods initiated by PCF. As a consequence, PCF cannot be used to provide reliability with regard to quality of service in networks supporting legacy users.

HCF was introduced in the IEEE 802.11e standard and provides a statistical method for providing quality of service to clients. It will be understood by to those skilled in the art that while HCF provides a level of quality of service in the statistical sense, HCF methods cannot provide the level of quality of service required for carrier/operator-grade networks.

Additionally, both PCF and HCF do not address the issues related to non-compliant devices nor the propensity of hidden nodes in the network which prevent standards based quality of service techniques to operate properly.

With the stunning growth of mobile Wi-Fi devices now representing 50% of Internet traffic, it is critical to enable service providers with flexibility to adapt to service both low latency reliable priority access clients together with nomadic standard 802.11 Wi-Fi devices in a single AP.

The present technology relates to and incorporates aspects of the IEEE 802.11 standards. Namely, the following definitions from various sections of the IEEE 802.11 standards are provided herein for reference purposes. NAV—Network Allocation Vector (also referred to as "Virtual Carrier Sensing"); PCF—Point Coordination Function; DCF—Distributed Coordination Function; PIFS—Point Coordination Function Interframe Space; and DIFS—Distributed Coordination Function Interframe Space.

FIG. 1 is a block diagram of an exemplary WiFi network 100, constructed in accordance with various embodiments of the present technology. The network 100 may include a plurality of end user client devices that include both a standard 802.11 client, hereinafter "standard access client 105" as well as a priority client, hereinafter "priority access client 110." Generally, the standard access client 105 includes any computing device that is configured to operate on any IEEE 802.11 specified protocol, such as 802.11a through 802.11n.

The priority access client 110 may comprise a processor 115 and a memory 120. The priority access client 110 may include a priority media access control (MAC) protocol 125 that allows the priority access client 110 to communicate with an AP 130. It is noteworthy that AP 130 may communicate with a plurality of standard access clients and a plurality of priority access clients simultaneously, as will be described in greater detail below. In some instances, the priority access client 110 may be configured to utilize both standard and priority protocols to communicate with the AP 130.

It is noteworthy that both the standard access client 105 and the priority access client 110 communicatively couple with the AP 130 in a wireless manner, as will be described in greater detail below. It will be understood that the AP 130 may be coupled with a wired/wireless network 170, such as the Internet.

The AP 130 generally includes a processor 135, a memory 140 having a standard access client 802.11 layer 145 and a priority access MAC layer 150, a cache 155, and a scheduling module 160. The processor 135 of the AP 130 executes instructions within the memory 140 of the AP 130 to allow a hybrid mix of communications between both the standard access client 105 and the priority access client 110. As would be known to one of ordinary skill in the art, both the standard access client 802.11 layer 145 and the priority access MAC layer 150 may be arranged as sublayers of a data link layer of a TCP/IP layer used by the AP 130.

The AP 130 may include, for example, a wireless router or other wireless hub or device that is configured to function as an interface between client devices and a network medium, such as the wired/wireless network 170. In other instances, the AP 130 may include a node within any network that is configured to service both standard access clients and priority access clients, where the priority access clients utilize a priority access MAC layer to communicate with the node. As with the AP 130, this node is configured to schedule access to the network for both the standard access clients and the priority access clients, allowing the node to service a much greater spectrum of client devices.

Returning back to the discussion of the AP 130, there are two phases of operation for the AP 130. The first is a standard access phase of operation. During the standard access phase of operation, the AP 130 services standard non-priority 802.11 clients and/or priority access clients operating in standard 802.11 mode. These clients are able to associate with the AP 130 and send/receive data during this phase.

The second phase of operation for the AP 130 is a priority access phase. During the priority access phase of operation, the AP 130 services priority access clients that run a priority access MAC protocol. Advantageously, the AP 130 allows for the scheduling of both the standard and priority access clients using the scheduling module 160.

Figure 2:
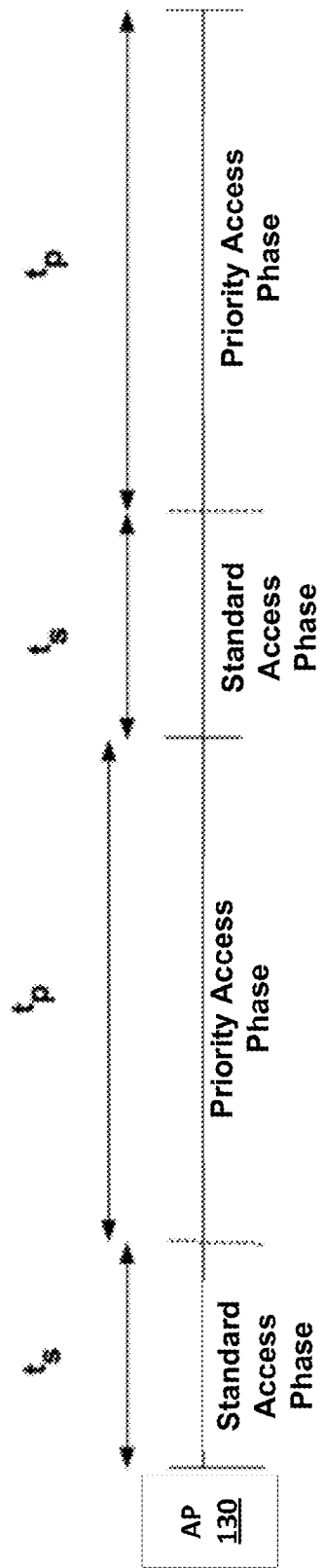
FIG. 2 is an exemplary communication schedule for a wireless access point that communicates with both standard 802.11 clients and priority access clients.

FIG. 2 illustrates the operation of the AP 130 in both standard and priority access phases. Notably, the scheduling module 160 of the AP 130 alternates standard access phases with the priority access phases. Because the AP 130 executes this alternation transparently to the client devices, the AP 130 is able to simultaneously offer access to the network 170 to both the standard and priority access clients.

Broadly described, the scheduling module 160 manages standard access phases and priority access phases for the AP 130. A standard access phase comprise a time period where the AP 130 allows only client devices using a standard 802.11 mode to communicate with the AP 130. Conversely, the priority access phases comprise time periods where the scheduling module 160 of the AP 130 allows only client devices using the priority access MAC protocol to communicate with the AP 130. Priority may be referred to as proprietary or fixed-access. In sum, prior to each phase (standard or priority), the AP 130 is configured to transmit a silencing signal to all clients, regardless of the mode of communication utilized by the client device.

More specifically, the phases are implemented by the scheduling module 160 in time divided intervals. For reference purposes, Ts is the duration that the AP 130 is allowed to operate in a standard access phase and $T_p$ is the duration of operation in a priority access phase. Again, the scheduling module 160 of the AP 130 alternates these phases such that they repeat over time as shown in FIG. 2.

Figure 3:
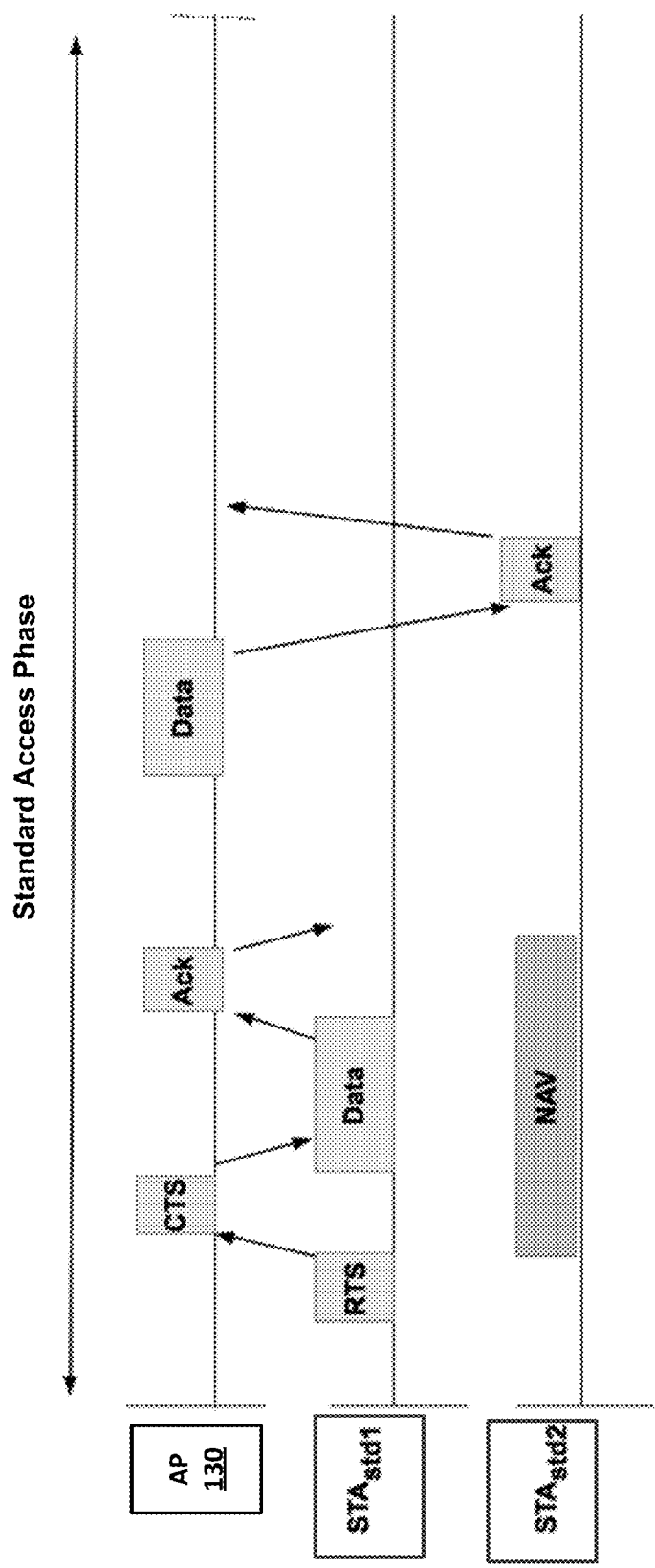
FIG. 3 is an exemplary signal flow diagram illustrating the operation of a wireless access point during a standard access phase.

FIG. 3 illustrates the operation of the AP 130 during a standard access phase. The AP 130 starts operating in the standard access phase by authenticating and associating both standard 802.11 clients and priority access clients operating in a standard 802.11 mode. Standard 802.11 clients are referred to as $STA_{STD1}/STA_{STD2}$ priority. It will be understood that in some instances the reference "$STA_{STD}$" may be utilized to refer generally to clients that operate in standard 802.11 mode.

Once the clients have been associated, the AP 130 loads an association context for the clients. In some instances, an association context may include encryption keys for the supported clients, which are stored into the cache 155. During the standard access phase, the AP 130 allows for automatic sharing of the wired or wireless network 170 associated with the AP 130 through the use of Carrier Sense Multiple Access with Collision Avoidance (CSMA/CA) and a random back-off time following a busy medium condition as per the DCF operation described in the IEEE 802.11 standard. The AP 130 may perform Career Sensing (CS) through both virtual and physical mechanisms.

Figure 4:
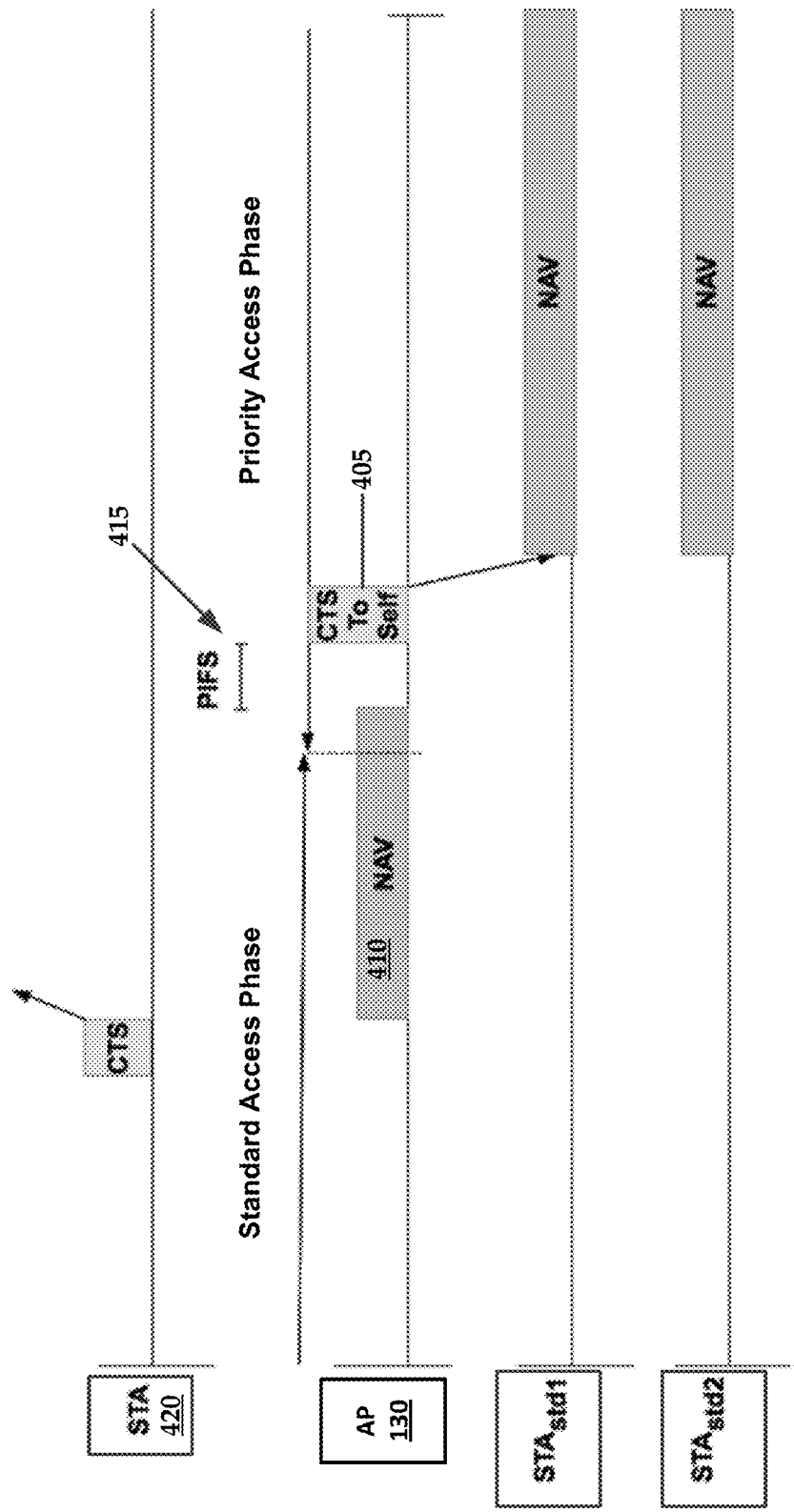
FIG. 4 is an exemplary signal flow diagram illustrating the operation of a wireless access point when switching between standard and priority access phases of operation.

FIG. 4 illustrates the AP 130 switching from a standard access phase to a priority access phase. When the AP 130 has operated in the standard access phase for a time duration $T > T_S$, the AP 130 switches to a priority mode of operation. In some instances, the AP 130 initiates the switch by sending a CTS-to-Self frame 405 with its duration field set to $T_P$ in order to silence all client devices.

It is noteworthy that the 802.11 standard allows a maximum CTS-to-Self duration value of $NAV_{MAX}=32767$, (i.e., 32 ms). If $T_P > NAV_{MAX}$, the AP 130 sets the duration field to $NAV_{MAX}$. Additionally, the AP 130 sets a timer that is equal to $NAV_{MAX}$. When the timer is close to expiration, the AP 130 sends another CTS-to-self frame with duration set to $T_P - NAV_{MAX}$ (if $< NAV_{MAX}$). This subsequent CTS-to-self frame forces all standard access clients ($STA_{STD1}$ and $STA_{STD2}$) to remain in NAV for the entire $T_P$ duration.

The transmission of CTS-to-self frames to all clients functions to silence all clients prior to the AP 130 communicating with priority access clients during the duration of the $T_P$ (e.g., a priority access phase). In some instances, the transmission of the CTS-to-self frames functions to silence both standard access clients and all priority access clients that are not in a client group with which the AP 130 is currently communicating. It is noteworthy that the AP 130 may selectively communicate with each group of priority access clients using an association context, such as a group ID and encryption key. As will be described in greater detail below, the AP 130 may selectively communicate with priority access clients using priority activation and deactivation frames, within a given priority access phase.

It will be understood that the AP 130 may send as many CTS-to-Self frames as required for all the standard operating clients to remain in NAV for duration of $T_P$. In some embodiments, the AP 130 may send the CTS-to-Self frames at a data rate such that all standard operating clients, including 802.11n clients that operate in the same band, do not interfere with the AP 130 operation during the priority access phase.

FIG. 4 also illustrates the switching of the AP 130 between standard and priority access phases, and specifically, during instances where the AP 130 is operating in NAV mode. It will be understood that the AP 130 may be put into NAV by virtue of a CTS frame that is received by the AP 130 from a standard access client 420. If the AP 130 is currently operating in NAV mode, the AP 130 waits until the NAV period 410 has expired and sends a CTS-to-self frame 405 after one PIFS interval 415. As per the IEEE 802.11 standard, PIFS<DIFS and hence the AP 130 gains access to the medium, such as the wired network 170 (see FIG. 1) before any standard operating client gains a transmit opportunity.

Figure 5:
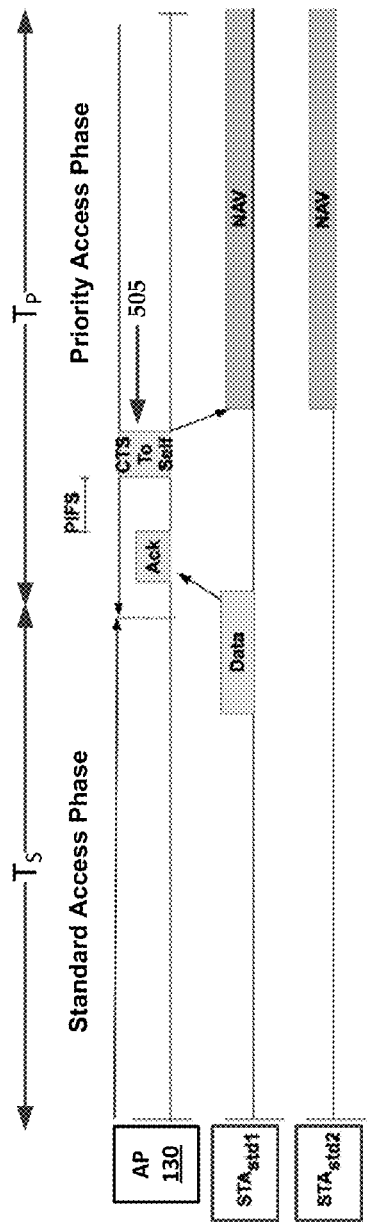
FIG. 5 is a signal flow diagram that illustrates the wireless access point switching between standard and priority access phases, namely when a standard access client is currently transmitting data to the wireless access point after expiration of the duration associated with the standard access phase.

FIG. 5 is a signal flow diagram that illustrates the AP 130 switching between standard and priority access phases, namely when a standard access client is currently transmitting data to the AP 130 after expiration of the duration $T_S$ associated with a standard access phase. If the AP is currently receiving a packet from a standard access client such as $STA_{STD1}$, the AP 130 waits until the packet is received and sends an Ack frame (if necessary) to the standard access client $STA_{STD1}$. The AP 130 also sends the CTS-to-Self frame 505.

Figure 6:
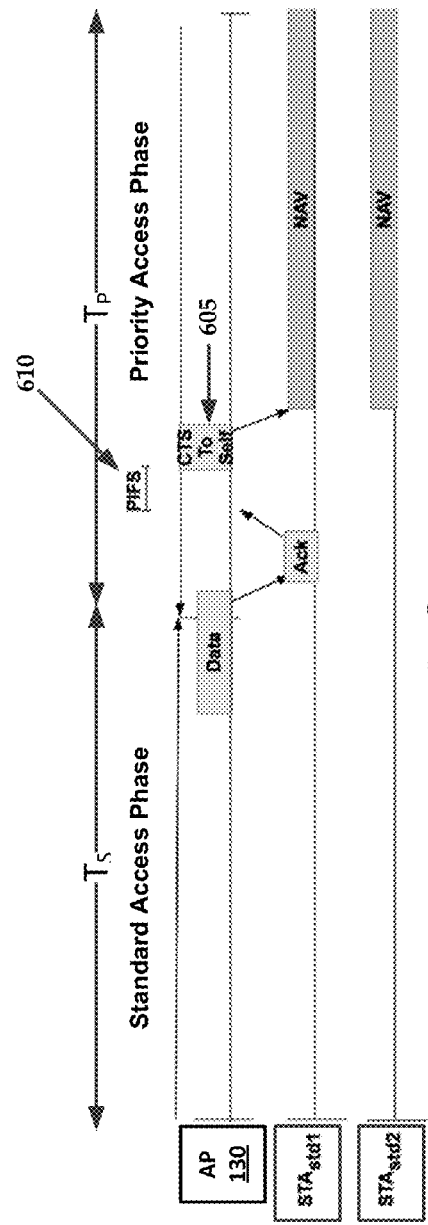
FIG. 6 is a signal flow diagram that illustrates the wireless access point switching between standard and priority access phases, namely when the wireless access point is currently transmitting data to the standard access client after expiration of the duration associated with the standard access phase.

FIG. 6 is a signal flow diagram that illustrates the AP 130 switching between standard and priority access phases, namely when the AP 130 is currently transmitting data to a standard access client after expiration of the duration $T_S$ associated with the standard access phase. If the AP is currently sending a packet to a $STA_{STD1}$, the AP 130 completes the current ongoing transmission, waits for an Ack frame (if necessary) from the standard access client $STA_{STD1}$, and sends a CTS-to-Self frame 605 after PIFS interval 610. So at the AP 130, when the $T_S$ threshold is reached, the ongoing transmissions are allowed to complete before the AP 130 sends any CTS-to-Self frame, thus switching the AP 130 into the priority access phase.

Immediately after sending a CTS-to-Self frame, the AP 130 switches a TX/RX profile at the AP 130 in order to service priority access clients that belong to Client Group 1 (CG1). One example of this is the reloading of the hardware accelerated encryption key cache 155. Let Gmax be the maximum keys (e.g., association context) that could be cached (currently Gmax=128) at the AP 130 at any point of time. This limits the number of clients that can communicate with the AP with encrypted frames. In some instances, any associated priority access clients and standard access clients that do not have their keys cached will not be able to communicate with AP until their keys are reloaded.

Figure 7:
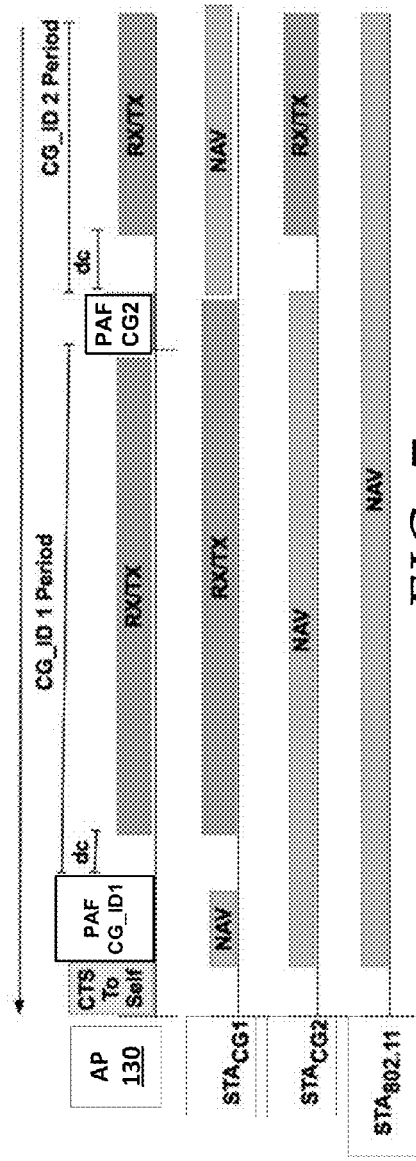
FIG. 7 is an exemplary signal flow diagram illustrating the operation of a wireless access point during a priority access phase, where the wireless access point schedules communications for two client groups of priority access clients.
Figure 8:
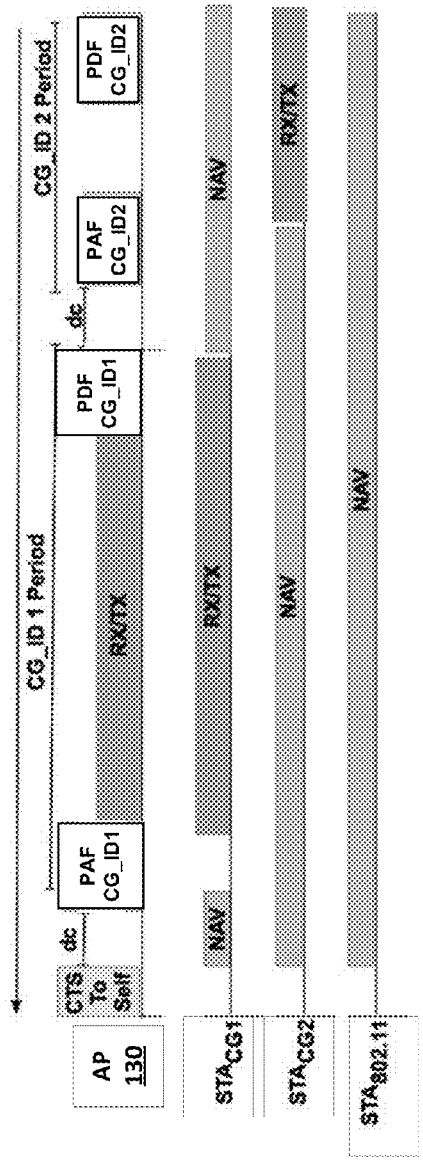
FIG. 8 is an exemplary signal flow diagram illustrating the operation of a wireless access point during a priority access phase, where the wireless access point utilizes both priority activation and deactivation frames to schedule communications for two client groups of priority access clients.

FIGS. 7 and 8 collectively illustrate the operation of the AP 130 during priority access phases. Prior to communicating with the priority access clients, the AP 130 groups the priority access clients into Client Groups (CGs) based on different parameters such as current traffic, client service priority, and so forth. This serves two purposes: (a) to reduce the number of $STA_{PA}$ that are going to contend for the medium at a particular time interval, thereby reducing collisions, and (b) in order to address the hardware limitations that may be encountered in servicing a large number of clients (e.g., encryption key cache). The AP 130 may assign a unique client group identifier to each client group created. The unique client group identifiers assigned to the client groups may be utilized by the AP 130 to coordinate or schedule access for the priority access client groups as will be described in greater detail below.

At the start of the priority access phase, the AP 130 sends a priority Action Frame called here as Priority Activation Frame (PAF) with CG_ID 1 and Duration dcg1(<dp) specified. Broadly, the PAF includes a client group identifier and a duration that specifies how long the client group is allowed to contend for access to the network 170.

The AP 130 then loads the cache 155 with an association context, such as any encryption key for the $STA_{PA}$ (priority access clients) that belong the CG_ID 1 group. Clients that belong to CG_ID 1 begin to contend for a channel opened by the AP 130, upon the clients receiving a PAF from the AP 130 after a duration of dc. The dc duration is a time the AP 130 requires to reload the cache 155 with new keys. This allows clients that belong to CG_ID 1 to access the channel for a duration of dcg1. When the duration dcg1 has passed, using a similar mechanism for switching from standard to priority access phase, the AP 130 waits until current transaction is complete and sends a PAF with CG_ID 2 and duration dcg2 and reloads the cache 155. $STA_{PA}$ that belong to CG_ID 2 start to contend for the channel after expiration of the duration dc. $STA_{PA}$ belonging to a particular group can access the medium only after receiving a PAF from AP 130 for that group and only for the duration specified in the PAF frame.

It will be understood that the "dc" duration may comprise a duration of any desired length. In some instances, the length of the duration may be predicated upon the time required by the AP 130 to reload the cache 155 with encryption keys for a client group. That is, the "dc" duration can include an arbitrary amount of time that defines how long it takes the AP 130 to unload and reload encryption keys in the cache 155. For example, the "dc" duration may be equal to the amount of time it takes to purge the cache 155 of encryption keys for client group CG_ID 1, as well as the time it takes the AP 130 to load encryption keys for client group CG_ID 2.

As an alternative shown in FIG. 8, the AP 130 can also activate and deactivate the groups of priority access clients by sending Priority Activation Frame (PAF) and Priority Deactivation Frame (PDF). In this case, the switch in profile occurs before the transmission of the frames.

The AP 130 divides the nodes into groups and assigns dCG values to the different groups taking the dp into account such that during a single phase, $(dCG1+dCG2+ \ldots dCGn)<(dp-dc-Tmax)$, where Tmax is the maximum time for an ongoing transmission opportunity (TXOP) transaction. Therefore, when a $STA_{STD}$ begins to contend for the channel after its NAV, the AP 130 has already loaded an association context of the $STA_{STD}$ in its cache 155 and has switched to the standard access phase of operation. The $STA_{STD}$ are now serviced and the operation repeats over time.

In some embodiments the AP 130 includes an 802.11ac 4×4:4 DL-MU-MIMO processor, configured with four panel antennas fixed 90-degree radiation patterns with limited overlap to achieve a near 360-degree total coverage.

Figure 9:
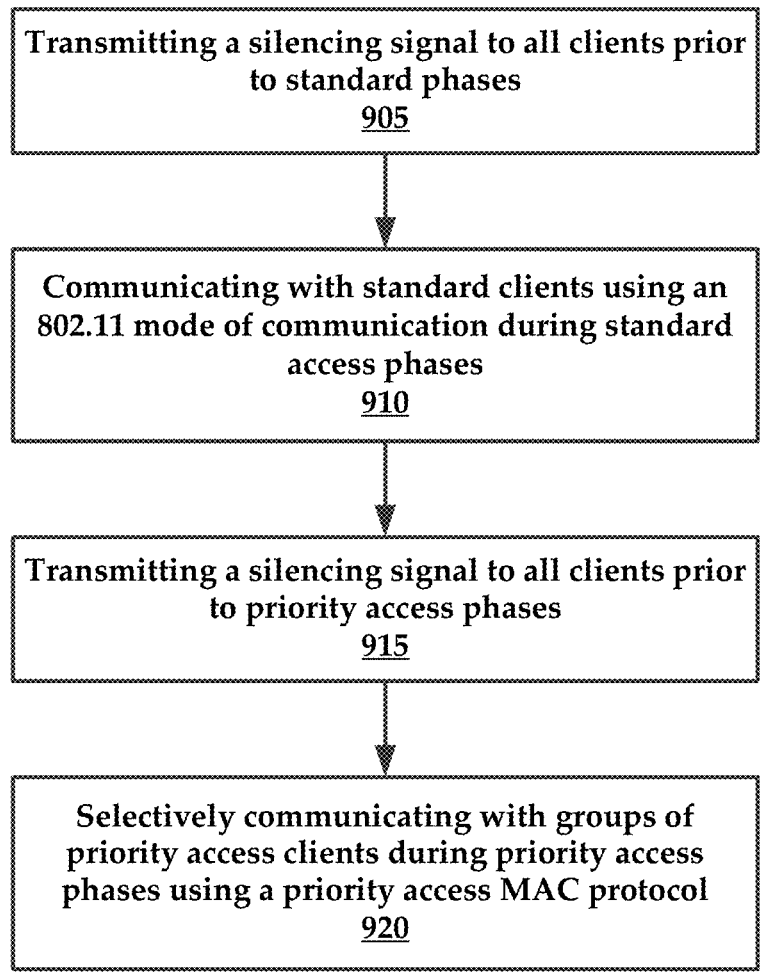
FIG. 9 is a flowchart of an exemplary method for scheduling communication of standard 802.11 clients and priority access clients that utilize a priority access MAC protocol, using a wireless access point.

FIG. 9 is a flowchart of an exemplary method for scheduling communication of standard 802.11 clients and priority access clients that utilize a priority access MAC protocol, using a wireless access point. According to some embodiments, the method may include transmitting 905 a silencing signal to all clients prior to standard access phases. For example, the AP may send a CTS-to-self frame to all clients prior to initiating communications with standard access clients. The method may also include communicating 910 with standard access clients during standard access phases.

Next, the method may include transmitting 915 a silencing signal to all clients prior to priority access phases. The method may then include selectively communicating 920 with groups of priority access clients during priority access phases using the priority access MAC protocol. It will be understood that the AP may "selectively" communicate with each of the groups of priority clients by transmitting priority activation and deactivation frames as described above. Thus, the AP may communicate with each group of priority clients within a given priority access phase, while standard access clients are in, for example, an NAV mode.

It is noteworthy that the steps shown in FIG. 9 may not occur in the order specified. That is, the silencing of client devices most frequently occurs prior to allowing other client devices to contend for communication with the AP 130. Thus, standard access clients are silenced before the AP 130 communicates with clients using priority protocols, and vice-versa.

Figure 10:
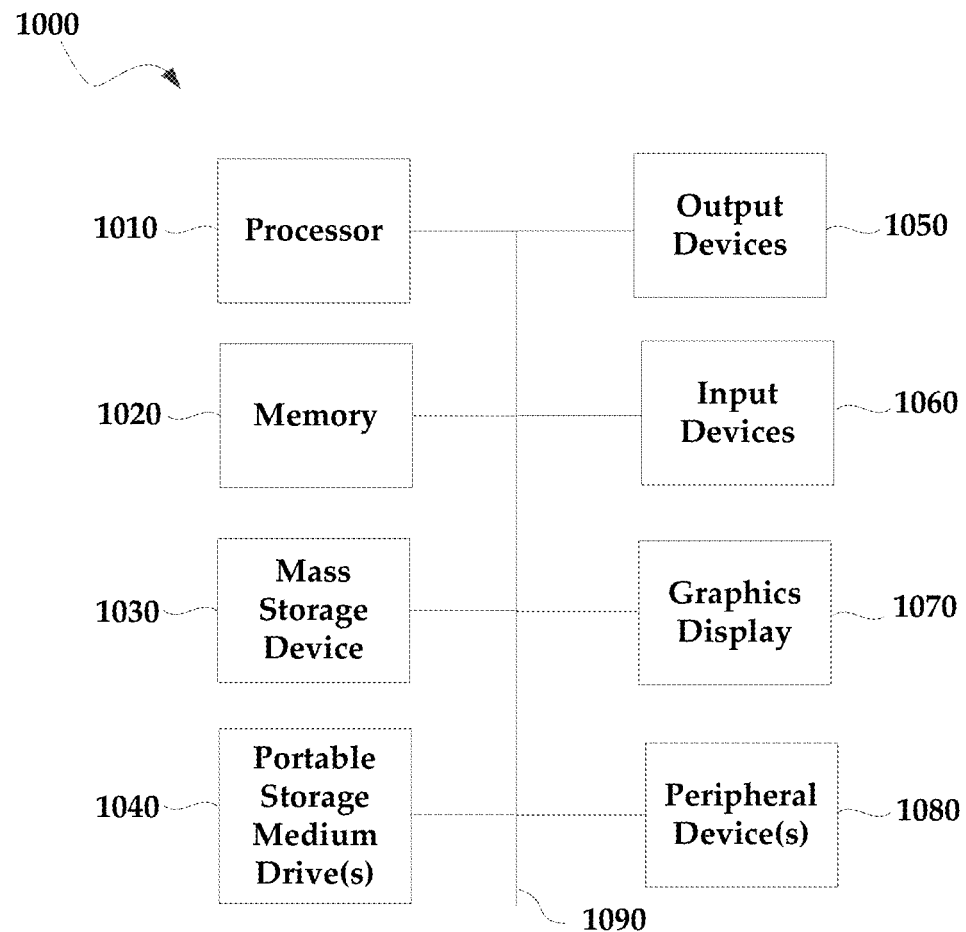
FIG. 10 illustrates an exemplary computing device that may be used to implement an embodiment of the present technology

FIG. 10 illustrates an exemplary computing device 1000 that may be used to implement an embodiment of the present technology. The device 1000 of FIG. 10 may be implemented in the contexts of the likes of computing devices, such as the client devices that utilized a priority access MAC/PHY layer to communicate with an AP. The computing device 1000 of FIG. 10 includes a processor 1010 and memory 1020. Memory 1020 stores, in part, instructions and data for execution by processor 1010. Memory 1020 may store the executable code when in operation. The system 1000 of FIG. 10 further includes a mass storage device 1030, portable storage medium drive(s) 1040, output devices 1050, input devices 1060, a graphics display 1070, and peripheral device(s) 1080.

The components shown in FIG. 10 are depicted as being connected via a single bus 1090. The components may be connected through one or more data transport means. Processor 1010 and main memory 1020 may be connected via a local microprocessor bus, and the mass storage device 1030, peripheral device(s) 1080, portable storage medium drive(s) 1040, and graphics display 1070 may be connected via one or more input/output (I/O) buses.

Mass storage device 1030, which may be implemented with a magnetic disk drive or an optical disk drive, is a non-volatile storage device for storing data and instructions for use by processor 1010. Mass storage device 1030 may store the system software for implementing embodiments of the present invention for purposes of loading that software into main memory 1020.

Portable storage medium drive(s) 1040 operates in conjunction with a portable non-volatile storage medium, such as a floppy disk, compact disk, digital video disc, or USB storage device, to input and output data and code to and from the computing system 1000 of FIG. 10. The system software for implementing embodiments of the present invention may be stored on such a portable medium and input to the computing device 1000 via the portable storage medium drive(s) 1040.

Input devices 1060 provide a portion of a user interface. Input devices 1060 may include an alphanumeric keypad, such as a keyboard, for inputting alpha-numeric and other information, or a pointing device, such as a mouse, a trackball, stylus, or cursor direction keys. Additionally, the device 1000 as shown in FIG. 10 includes output devices 1050. Suitable output devices include speakers, printers, network interfaces, and monitors.

Graphics display 1070 may include a liquid crystal display (LCD) or other suitable display device. Graphics display 1070 receives textual and graphical information, and processes the information for output to the display device.

Peripheral device(s) 1080 may include any type of computer support device to add additional functionality to the computing system. Peripheral device(s) 1080 may include a modem or a router.

The components provided in the computing device 1000 of FIG. 10 are those typically found in computing systems that may be suitable for use with embodiments of the present invention and are intended to represent a broad category of such computer components that are well known in the art. Thus, the computing system 1000 of FIG. 10 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A computing device configured to communicate with a wireless access point using a media access control (MAC) protocol, the computing device comprising:
   a processor; and
   a memory for storing a MAC protocol, wherein the MAC protocol is executed by the processor to:
      receive a priority activation frame from the wireless access point;
      evaluate the priority activation frame received from the wireless access point to determine if a group identifier included in the priority activation frame corresponds to a group identifier assigned to the computing device by the wireless access point;
      communicate with the wireless access point, for a specified period of time specified in the priority activation frame, if the group identifier of the priority activation frame matches the group identifier of the computing device;
      receive a priority deactivation frame from the wireless access point;
      cease communication with the wireless access point after receiving the priority deactivation frame; and
      communicate with the wireless access point during standard access phases, which is after the specified period of time specified in the priority activation frame, using a standard 802.11 mode when the computing device is nomadic, the standard access phases not overlapping with a specified period of time specified in a priority activation frame.

2. The computing device according to claim 1, wherein the processor executes the MAC protocol to receive a priority deactivation frame from the wireless access point prior to ceasing communication with the wireless access point.

3. The computing device according to claim 1, wherein the processor executes the MAC protocol to receive a group identifier for each of a priority access group and a standard access group.

4. A method executed by a computing device configured to communicate with a wireless access point using a media access control (MAC) protocol, the method comprising:
   evaluating a priority activation frame received from the wireless access point to determine if a group identifier included in the priority activation frame corresponds to a group identifier assigned to the computing device by the wireless access point;
   communicating with the wireless access point when the computing device is fixed, for a specified period of time specified in the priority activation frame, if the group identifier of the priority activation frame matches the group identifier of the computing device;

ceasing communication with the wireless access point if the group identifier of the priority activation frame does not match the group identifier of the computing device; and communicating with the wireless access point during standard access phases using a standard 802.11 mode when the computing device is nomadic, the standard access phases not overlapping with a specified period of time specified in a priority activation frame.

5. The method according to claim 4, further comprising receiving a priority deactivation frame from the wireless access point prior to ceasing communication with the wireless access point.

6. The method according to claim 4, further comprising receiving a group identifier for each of a priority access group and a standard access group.

* * * * *